United States Patent [19]
Schulz

[11] Patent Number: 5,901,743
[45] Date of Patent: May 11, 1999

[54] VALVE SYSTEM, ESPECIALLY FOR USE IN VETERINARY SYRINGES

[75] Inventor: Dieter Schulz, Muelheim, Germany

[73] Assignee: Henke-Sass, Wolf GmbH, Tuttlingen, Germany

[21] Appl. No.: 08/963,107

[22] Filed: Nov. 3, 1997

[30] Foreign Application Priority Data

Jan. 15, 1997 [DE] Germany ................ 297 00 657 U

[51] Int. Cl.⁶ .................................................. F16K 15/00
[52] U.S. Cl. ................. 137/515.5; 137/540; 137/543.23
[58] Field of Search .................... 137/540, 469, 137/543.21, 515.5, 515, 315, 543.23, 542, 543.13

[56] References Cited

U.S. PATENT DOCUMENTS

| | | | |
|---|---|---|---|
| 1,337,462 | 4/1920 | Marulli | 137/515.5 |
| 2,447,729 | 8/1948 | Bertea | 137/543.23 |
| 2,481,713 | 9/1949 | Bertea | 137/515.5 |
| 2,850,039 | 9/1958 | Johnson | 137/517 |
| 3,029,835 | 4/1962 | Biello et al. | 137/515.5 |
| 4,776,369 | 10/1988 | Lardner et al. | 137/515.5 |

*Primary Examiner*—Denise L. Ferensic
*Assistant Examiner*—Joanne Y. Kim
*Attorney, Agent, or Firm*—McAulay Nissen Goldberg Kiel & Hand, LLP

[57] ABSTRACT

A valve system, especially for use in a veterinary syringe, comprises a valve body which is arranged in a valve space formed between a first part having a valve seat and a second part which presses the valve body against the valve seat under influence of spring force. The valve body has, in an area adjacent to the valve seat, projections which are directed radially outwardly. The valve space has, at a bore hole surface, a projection directed radially inwardly and having an inner diameter. The projections of the valve body which are directed outwardly are arranged between the valve seat and the inwardly directed projection of the valve space. The projections of the valve body and the inwardly directed projection of the valve space are constructed elastically. The inner diameter formed by the projection of the valve space is smaller than an outer diameter formed by the projections of the valve body.

5 Claims, 4 Drawing Sheets

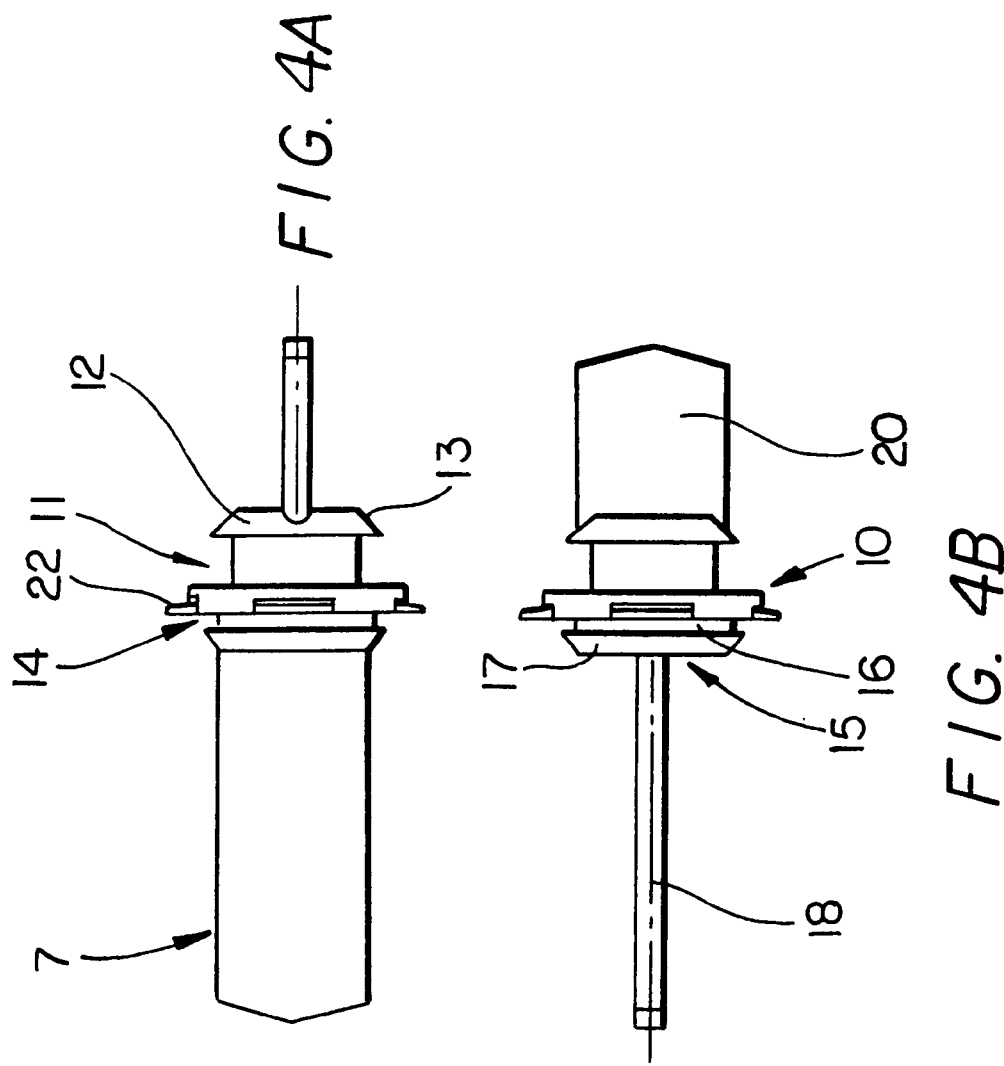

VALVE SYSTEM, ESPECIALLY FOR USE IN VETERINARY SYRINGES

BACKGROUND OF THE INVENTION a) Field of the Invention

The invention is directed to a valve system, especially for use in a veterinary syringe, this valve system comprising a valve body which is arranged in a valve space formed between a first part having a valve seat and a second part which presses the valve body against the valve seat under the influence of spring force.

b) Description of the Related Art

Such valve systems can be provided, for example, between the syringe cylinder and the syringe shoulder of a veterinary syringe as an outlet valve or in the end of the piston rod projecting into the syringe cylinder and the plunger fastened therein as an inlet valve.

When the valve system acting as outlet valve is disassembled, for example, when cleaning the veterinary syringe, the second part of the valve system is also removed from the first part and the valve body arranged between the two parts as well as the spring element provided therein fall out and could get lost, especially when the veterinary syringe is being used outdoors, which is usually the case, and the ground vegetation is dense. It is then almost impossible to find the relatively small valve body again and this causes a loss of time and money for replacing the lost parts.

OBJECT AND SUMMARY OF THE INVENTION

On this basis, the primary object of the invention is to further develop a valve system of the generic type in such a way that the operating reliability of the veterinary syringe is further improved and its handling is further simplified.

According to the invention, this object is met in a valve system of the type mentioned in the beginning in that the valve body has, in the area adjacent to the valve seat, projections which are directed radially outward, and the valve space has, at its bore hole surface, a projection which is directed radially inward, wherein the projections of the valve body which are directed outward are arranged between the valve seat and the inwardly directed projection of the valve space, wherein the inner diameter formed by the projection of the valve space is smaller than the outer diameter formed by the projections of the valve body and the projections of the valve body are constructed as individual elastic-flexible tongues that extend segment-wise along the circumference.

The essential advantage of the arrangement according to the invention consists in that the valve body is arranged in such a way that it cannot get lost due to the fact that its larger outer diameter overlaps with the smaller inner diameter of the valve space. This is especially useful when the valve system is disassembled, e.g., for cleaning purposes. Thus, the user need no longer hold the veterinary syringe in such a way as to prevent the falling out of the valve body which is arranged loose in the valve system. The valve body can now only move away from the valve seat until its radially outwardly directed projections contact the radially inwardly directed projection of the valve space; this prevents the valve body from falling out or sliding out due to sheer force of gravity. On the other hand, if it is desired to remove the valve body from the valve space, this can easily be accomplished manually because the projections at the valve body are constructed as elastic-flexible tongues and with a slight expenditure of force, an elastic deformation is enabled to the extent that the valve body can be pulled out. Conversely, assembly can also be carried out easily in a corresponding manner, for which purpose, the valve body, merely by overcoming the small force required for elastic deformation of the projection or projections, is inserted into the valve space until the projections at the valve body have passed the projection in the valve space and the deformation is canceled again.

Advantageously, on the one hand, when these tongues contact the projection in the valve space the contact surfaces are sufficiently large to prevent the valve body from falling out and thus to ensure that they will not get lost; on the other hand, the requirement that the valve body can be introduced into and removed from the valve space with little expenditure of force is accordingly also satisfied. Thus, in a preferred construction, four tongues are provided so as to be distributed around the outer circumference of the valve body in a radial symmetric manner.

A construction variant which is preferred on technical grounds concerning manufacture consists in that the elastic-flexible tongues are formed integral with the valve body. It is therefore possible to incorporate the production of the valve body, including the tongues, in one and the same work process and to keep the costs for manufacturing the valve body small.

A further preferred construction provides that the projection at the inner circumferential surface of the valve space is constructed as an annular bead or torus extending around the entire circumference. Since the valve body is held loosely in the valve space and there consequently exists the possibility of rotation about its longitudinal axis, it can be ensured with this construction that even during a rotation of the valve body and the resulting change in the position of the projections at the valve body, these projections will always contact the projection of the valve space in the event the valve body is unintentionally removed from the valve seat.

A particularly advantageous further development of the invention consists in that the valve body has an annular groove in which at least one turn of the helical spring engages and which holds the helical spring in a positive engagement so as to prevent it from sliding out of the valve body. This construction has the advantage that when the valve space is opened, e.g., when changing the spray tube, not only is the valve body prevented from sliding out of the valve space, but the helical spring is now also prevented from sliding out of the valve body and is accordingly also safeguarded against loss.

The invention enables a substantially simpler handling of the veterinary syringe, which is particularly useful when exchanging or removing the spray tube, since there is now no longer the risk that the valve body and/or the helical spring can be lost through inattentive handling. The dependable operation of the veterinary syringe is accordingly still further improved and its handling is further simplified.

An embodiment example showing the invention is described with the help of the drawings.

BRIEF DESCRIPTION OF THE DRAWINGS

In the drawings:

FIG. 4 shows the valve body in a side view, in another view which is rotated by 90°, and in a top view from the direction of the syringe cylinder of the veterinary syringe.

DESCRIPTION OF THE PREFERRED EMBODIMENTS

Figure 1:
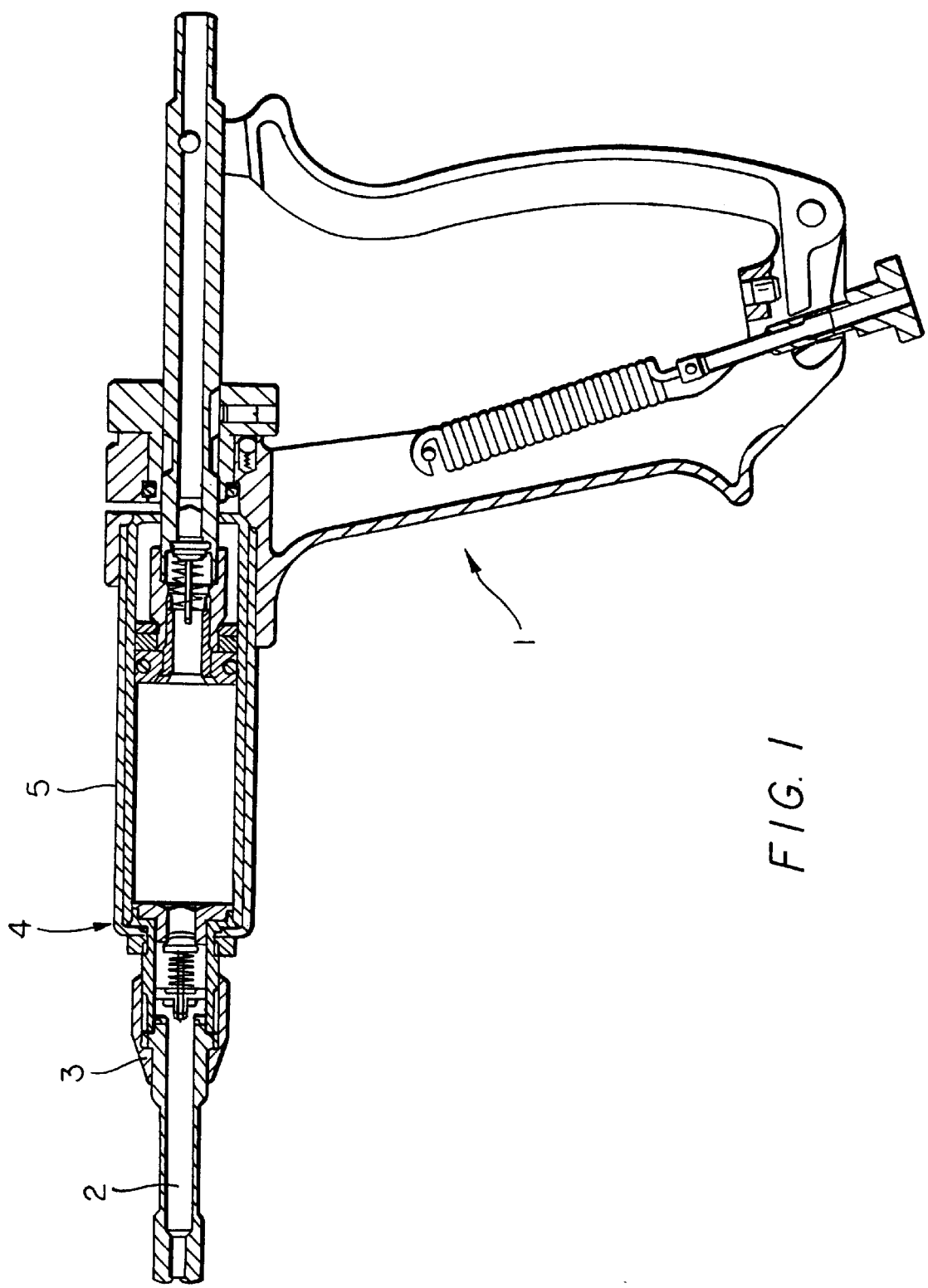
FIG. 1 shows a longitudinal section through a veterinary syringe constructed as an injection gun.

FIG. 1 shows a veterinary syringe 1 which is constructed as an injection gun and which has an exchangeable spray tube 2 which is fastened to the front part 4 of the syringe cylinder 5 by means of a union nut 3.

Figure 2:
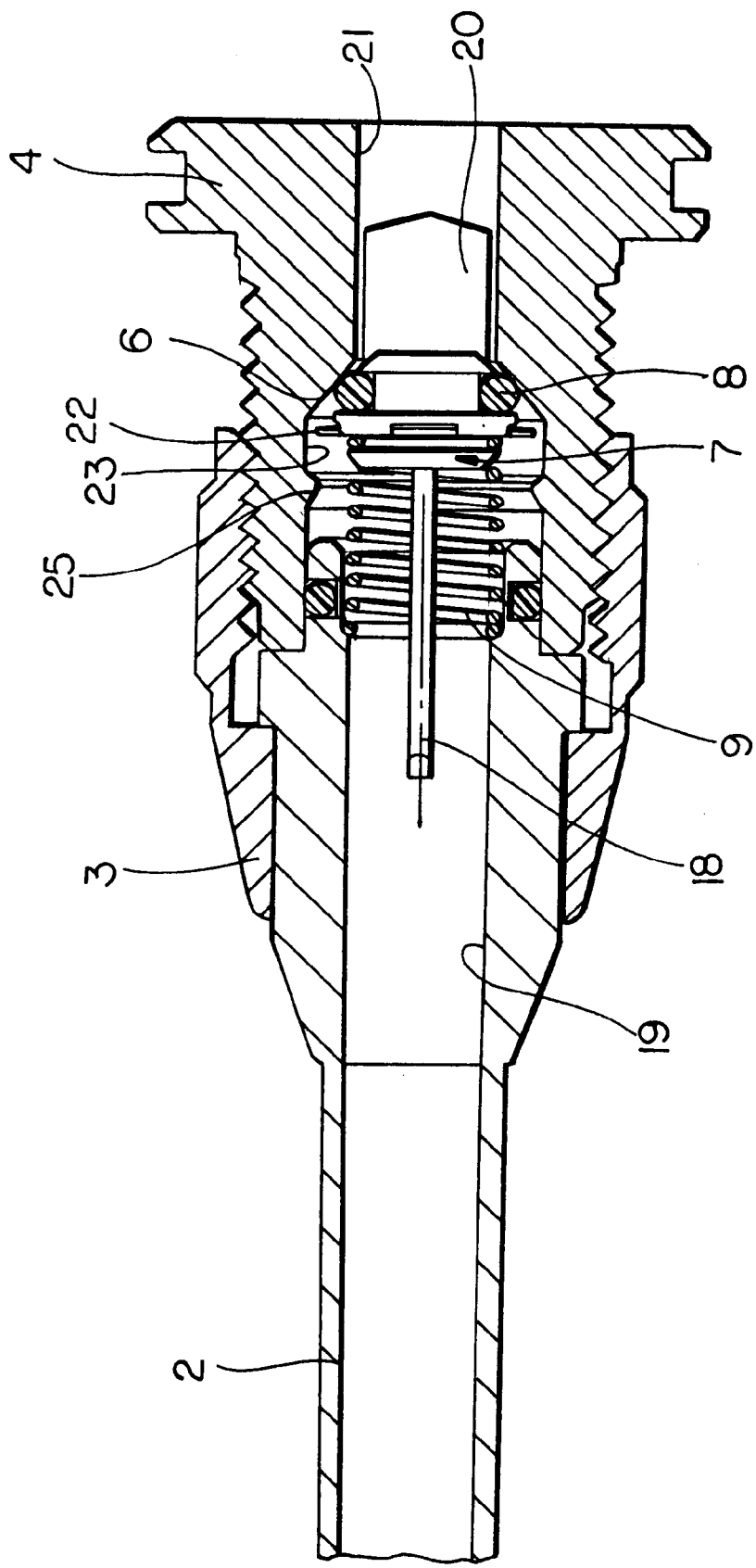
FIG. 2 shows a longitudinal section through the front part of the veterinary syringe and the spray tube fastened thereto.
Figure 3:
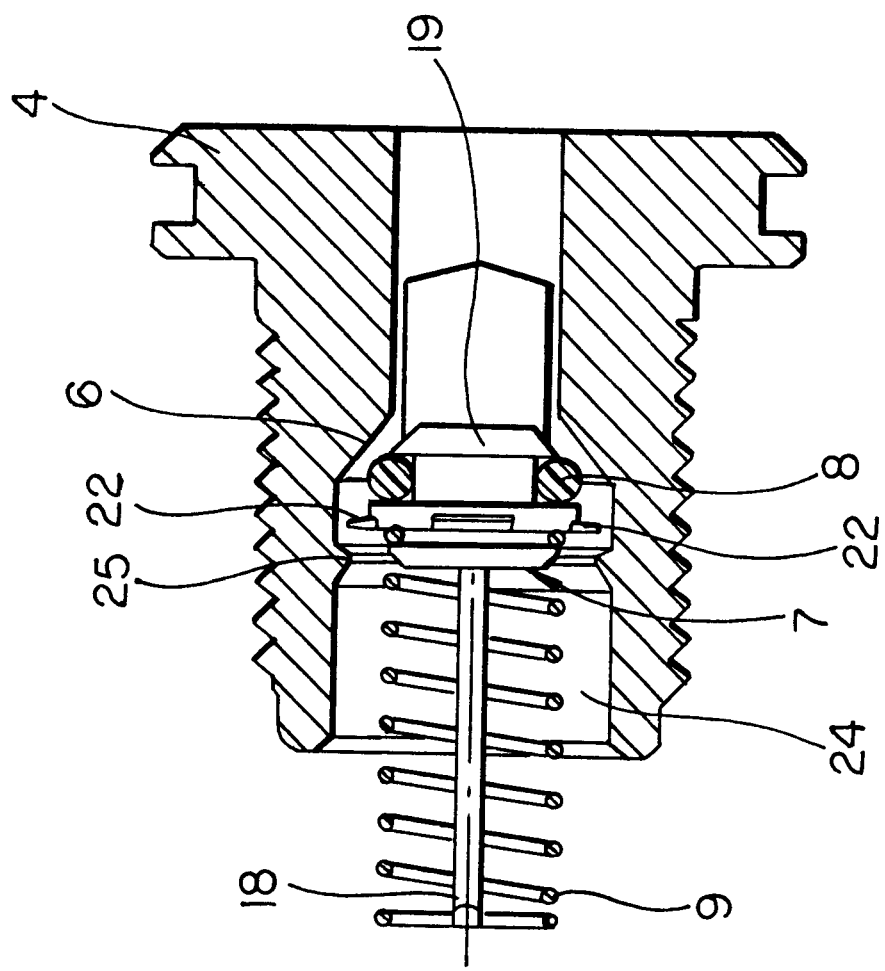
FIG. 3 shows a longitudinal section through the front part of the veterinary syringe with inserted valve body.

The front part 4 is shown in an enlarged view in FIG. 2 and FIG. 3 with mounted spray tube 2 and it can be seen that a valve system acting as an outlet valve is built into it. This valve system has a valve seat 6 which is worked into the front part 4, a valve body 7 which is outfitted with an O-ring 8, and a helical spring 9 which is arranged so as to be pretensioned between an end face of the spray tube 2 and the valve body 7 and presses the valve body 7 with the O-ring 8 directly against the valve seat 6.

FIG. 4 shows the valve body 7 in a side view and in another side view which is rotated by 90° relative thereto and in a top view from the direction of the spray tube 2. The O-ring 8 and the helical spring 9 are not shown for the sake of clarity.

Midway along its length, the valve body 7 comprises a cylindrical part 10 which has, in turn, differently formed cylindrical portions arranged one after the other.

Thus, a first portion 11 is provided for receiving the O-ring 8 which rests against the valve seat 6 in the installed state. In order to prevent the O-ring 8 from accidentally coming loose from the valve body 7, the portion 11 has a collar 12 with a larger diameter whose outer end face 13 is conical so that the O-ring 8 can be slipped over the collar 12 while widening.

On the side located opposite to the collar 12, the O-ring 8 contacts a second portion 14 which has a greater diameter than the portion 11 with the collar 12 and is constructed annularly.

Adjoining this second portion 14 is a third cylindrical portion 15 which is constructed similar to the first portion 11 and has an annular groove 16, the end of the helical spring 9 which was slipped over the conical collar 12 being held therein.

In order to lend a certain stability to the helical spring 9, the valve body 7 has a flat, tongue-shaped structural component part 18 which is provided at the third portion 15, directed toward the spray tube 2 and projects into the bore hole 19 of the spray tube 2. Another structural component part 20 which is likewise tongue-shaped is located across from this structural component part 18 and is rotated by 180° in the direction of the syringe cylinder 5 at the collar 12 and projects into the bore hole 21 provided in the front part 4. These two tongue-shaped structural component parts 18 and 20 guide the valve body 7 inside the bore holes 19 and 20 of the spray tube 2 and of the front part 4, respectively, so that the valve body is correctly seated and accordingly exercises its closing function without defect.

In order to prevent the valve body 7 with the helical spring 9 and the O-ring 8 from falling out when the spray tube 2 is unscrewed from the front part 4, the valve body 7 has, at its second portion 14, projections 22 which project beyond its outer diameter and which are less thick than the second portion 14 and are accordingly elastically deformable when pressed against resistance.

This resistance is in the form of a torus 25 which projects inward radially over the bore hole surface 23 into the valve space 24 and accordingly has a smaller inner diameter than the inner diameter of the valve space 24 containing the valve system. For this purpose, the inner diameter of this torus 25 is smaller than the outer diameter formed by the projections 22 which are designed as tongues that are distributed along the circumference of the second portion 14 at regular intervals. The embodiment example shows four advantageous tongues of this kind. These tongues are made of plastic, as is the entire valve body 7, whereas the front part 4, the spray tube 2 and the union nut 3 are made of metal. If the union nut 3 is detached and the spray tube 2 is removed from the front part 4, the valve body 7 cannot fall out of the valve space 24 of the front part 4, since the tongue-shaped projections 22 come to rest against the torus 25. However, the valve body 7 can be pulled out of the front part 4 when the valve body 7 is grasped at its tongue-shaped structural component part 18 and is then pulled out while overcoming the force exerted by the elastically deformable tongue-shaped projections 22 when these projections bend so as to be able to slide through under the torus 22.

The process is carried out in the reverse sequence when the valve body 7 is inserted into the valve space 24.

While the foregoing description and drawings represent the preferred embodiments of the present invention, it will be obvious to those skilled in the art that various changes and modifications may be made therein without departing from the true spirit and scope of the present invention.

What is claimed is:

1. A valve system, especially for use in a veterinary syringe, which valve system comprises:

a valve body which is arranged in a valve space formed between a first part having a valve seat and a second part which presses the valve body against said valve seat under influence of spring force;

siad valve body having in an area adjacent to said valve seat, projections which are directed radially outwardly;

said valve space having a bore hole surface, a projection directed radially inwardly and having an inner diameter;

said projections of said valve body which are directed outwardly being arranged between said valve seat and said inwardly directed projection of said valve space;

said inner diameter formed by the projection of the valve space being smaller than an outer diameter formed by the projections of the valve body; and said projections of said valve body are constructed as individual elastic-flexible tongues that extend segment-wise along the circumference.

2. The valve system according to claim 1, wherein four tongues are provided so as to be distributed around the outer circumference of the valve body in a radially symmetric manner.

3. The valve system according to claim 1, wherein the elastic-flexible tongues are formed integral with the valve body.

4. The valve system according to claim 1, wherein the projection at the inner circumferential surface of the valve space is constructed as a torus extending around the entire circumference.

5. The valve system according to claim 1, wherein the valve body has an annular groove in which at least one turn of the helical spring engages and which holds a helical spring in a positive engagement so as to prevent it from sliding out of the valve body.

a valve body which is arranged in a valve space formed between a first part having a valve seat and a second part which presses the valve body against said valve seat under influence of spring force;

said valve body having in an area adjacent to said valve seat, projections which are directed radially outwardly;

said valve space having a bore hole surface, a projection directed radially inwardly and having an inner diameter;

said projections of said valve body which are directed outwardly being arranged between said valve seat and said inwardly directed projection of said valve space;

said inner diameter formed by the projection of the valve space being smaller than an outer diameter formed by the projections of the valve body; and said projections of said valve body are constructed as individual elastic-flexible tongues that extend segment-wise along the circumference.

* * * * *